July 21, 1959
F. MINECK
2,895,741
FRONT END SUSPENSION FOR MOTOR VEHICLES
Filed Feb. 24, 1958
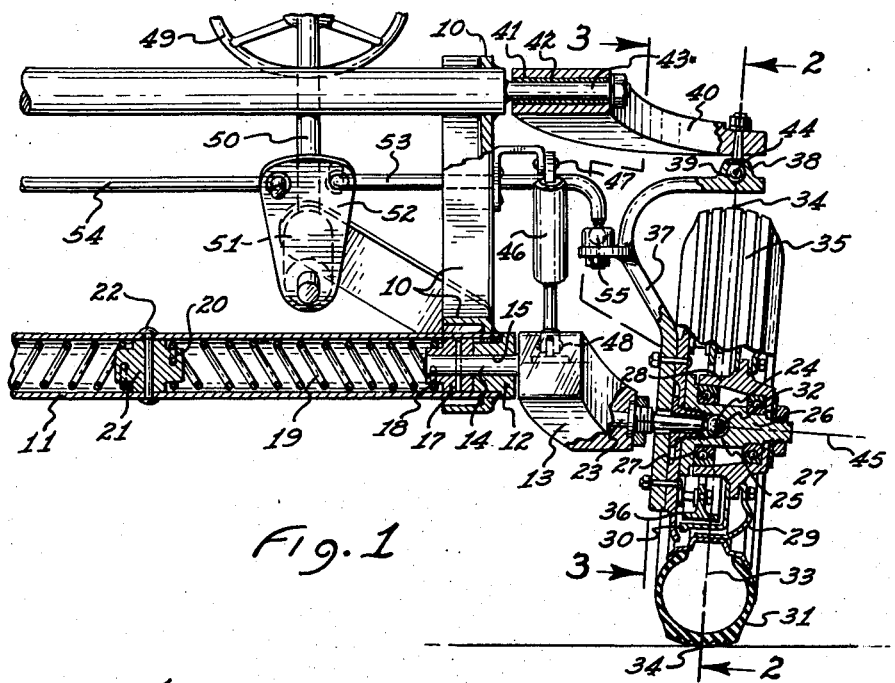
Fig. 1
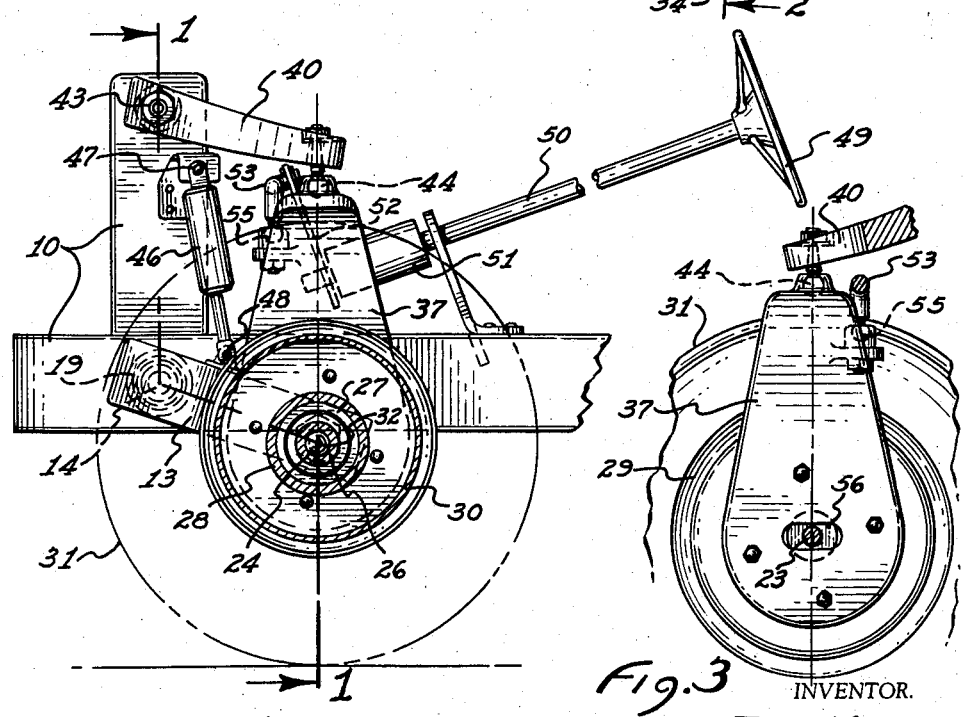
Fig. 2
Fig. 3
INVENTOR.
FRED MINECK.
BY
William B. Grant
ATTORNEY.

2,895,741

FRONT END SUSPENSION FOR MOTOR VEHICLES

Fred Mineck, Phoenix, Ariz.

Application February 24, 1958, Serial No. 717,168

2 Claims. (Cl. 280—96.3)

This invention pertains to improvements in a front end suspension system for motor vehicles.

One of the objects of this invention is to provide an improved front end suspension system which is more efficient in operation requiring less steering effort and much better riding characteristics.

Another object is to construct a front end suspension system in which all turning of the front wheels takes place about a vertical axis lying in the plane defined by the center of the tread of the tire.

Another feature is to provide a front end suspension system in which the tread width remains constant under all operating conditions.

It is also an object to provide in the suspension system trailing arms with the wheel structures mounted on ball joints on the outer ends of the upper and lower trailing arms.

Another feature of this invention is the use of torsion coil springs for more compactness and conservation of space in the vehicle frame.

The apparatus also provides equal caster and camber for the front wheels under all load and turning conditions.

A further advantage is that the front wheel steering is much easier with only three turns of the steering wheel being required for complete turn from extreme right to extreme left or vice versa.

It is also to be noted that the application of the brakes is accomplished more evenly and without any tendency to pull the steering wheel to one side or the other.

Road shock transmitted to the frame and steering gear is greatly reduced by use of this suspension system.

Other features of this suspension system are the use of shock absorber mechanism directly in conjunction with the aforementioned torsion coil springs; easier assembly during manufacturing; and greater tire life from constant alignment of wheels and treads under all operating conditions.

It will be further noted that stabilizer bar mechanism can be efficiently installed to control excessive sway on fast turns.

The single ball joint wheel spindle mounting makes possible the use of much wider and more efficient brake drums.

Another feature is more stable cornering because of the use of outrigger control arms.

And another object is to provide fully adjustable camber, caster and toe in angles.

And still another advantage of the above structure is a much simpler steering gear control linkage with less strain and road shock to be overcome in the steering linkage.

Additional advantages of this invention are the provision of height adjustment should springs become weak after long use; lower ball joint socket only slotted horizontally for extra strength; and the elimination of front end dip at quick stops.

Further features and advantages of this invention will appear from a detailed description of the drawings in which:

Fig. 1 is an enlarged transverse sectional view through a front end suspension system for a motor vehicle incorporating the features of this invention, indicated by the line 1—1 of Fig. 2.

Fig. 2 is an enlarged side elevation indicated by the line 2—2 in Fig. 1.

Fig. 3 is an enlarged fragmentary section on the line 3—3 of Fig. 1.

As an example of one embodiment of this invention there is shown an automotive vehicle chassis comprising a frame 10 to which is rigidly fixed the transverse tube 11 in the outer end of which is fixed the bushing 12. A lower trailing arm 13 has an integral trunnion shaft 14 journalled against axial movement in the bore 15 of the bushing 12 and projecting from the bushing 12 into the bore 16 of the tube 11. The trunnion shaft 14 has fixed on its projecting end the collar 17 to which is rigidly secured one end 18 of the torsion coil spring 19, the other end 20 of the spring 19 being fixed to the plug 21 rigidly secured by the bolt 22 intermediate the ends of the tube 11. By this arrangement the torsion coil spring 19 yieldingly opposes the upward swinging movement of the lower trailing arm 13 as the loaded vehicle travels over the road.

On the outer end of the lower trailing arm 13 is fixed the stub shaft 23 which terminates in a ball joint 24 which is received in a socket 25 formed in the wheel spindle 26 which carries the usual anti-friction bearings 27 upon which the wheel hub 28 rotates. The usual wheel 29, brake drum 30, and tire 31 are mounted on the wheel hub 28. It is to be noted that the ball joint 24—25 has its center of pivoting 32 located in the plane 33 defined by the center line 34 of the tire tread 35.

The wheel spindle 26 and the usual brake shoes 36 are carried on the link 37 which extends upwardly and out over the tire 31 where there is provided a socket 38 adapted to receive a ball 39 fixed in the outer end of the upper trailing arm 40 which is pivotally supported at its inner ends by its bore 41 journaled on the bearing surface 42 of a shaft 43 fixed to the frame 10 of the chassis. It is to be noted that the ball joint 38—39 has its center of pivoting 44 lying in the plane 33 of the center line 34 of the tire tread 35 as in the case of the ball joint 24—25 with the ball joint 24—25 having its center of pivoting 32 also lying on the axis of rotation 45 of the wheel 29 and tire 31. A suitable shock absorber 46 may be interconnected between the frame 10 at the point 47 and the lower trailing arm 13 at the point 48 to control the operation of the spring 19 in the usual manner.

The steering gear comprises the usual steering wheel 49 fixed to the steering wheel shaft 50 having a suitable nut box 51 fixed to the frame 10 of the vehicle from which extends the clevis 52 to the outer end of which is connected the drag links 53 and 54 which in turn are connected at their outer ends by suitable ball joints 55 to the links 37 so that manipulation of the steering wheel 49 causes sidewise swinging and steering of the wheels about the ball joint 24—25. Under these circumstances it will be noted that the ball joint socket 25 need only be elongated with a horizontal slot 56 as best seen in Fig. 3, resulting in a strong structure to take vertical loading and shocks during the operation of the vehicle.

It is important to note that the center of pivoting 32 of the ball joint 24—25 and the center of pivoting 44 of the ball joint 38—39 remain at all times in the plane 33 of the center line 34 of the tread 35 of the tire 31. Thus any adjustment of camber, caster and toe in can be readily and accurately made without effecting the other adjustments. Also, it will be noted that up and down movements and steering movements of the wheels in no way change the camber, caster, toe-in and tread width because of these critical relationships of the ball joints to the plane of the tire tread. Furthermore, the parallelogram linkage of the upper and lower trailing arms, linked together at their outer ends and with the wheel spindle and the outer pivot point of the lower trailing arm provides a soft and shockless ride on all kinds of roads. Also, with the ball joint 24—25 in the plane 33 of the tire, there is no tendency for the head-on forces of chuck holes and the like to swing the wheels to one side or the other resulting in excellent steering characteristics and control under all operating conditions.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A front wheel suspension for a motor vehicle having a frame, a wheel, a tire on the periphery of said wheel, a brake including a brake drum and brake shoes located within said wheel, a wheel spindle having wheel bearings rotatably supporting said wheel, a stub shaft having a ball on the outer end thereof, a spherical socket in said wheel spindle having its center located on the axis of rotation of said wheel and in the plane defined by the center line of the tread of said tire, a link fixed to said wheel spindle, a spherical socket on the outer end of said link having its center lying in the plane defined by the center line of the tread of said tire and located beyond the periphery of said tire tread, a ball member received in said last mentioned socket, and means on said frame for supporting said wheel spindle and said ball member for restrained vertical relative movement on said frame.

2. In a front wheel suspension for a motor vehicle having a frame and wheel suspension mechanism adapted to restrained relative vertical movement on said frame, means for attaching the road wheel to said suspension mechanism including a first ball joint connection having its center located on the intersection of the axis of wheel rotation and the plane defined by the center line of the tread of the tire on said wheel, and a second ball joint having its center lying in said plane defined by the center line of the tread of the tire and located outside of the peripheral tread surface of said tire.

References Cited in the file of this patent

UNITED STATES PATENTS

| | | |
|---|---|---|
| 1,446,431 | Parnacott | Feb. 20, 1923 |
| 2,018,653 | Best | Oct. 29, 1935 |
| 2,023,254 | Stimson | Dec. 3, 1935 |
| 2,285,445 | Kost | June 9, 1942 |
| 2,631,867 | Kost et al. | Mar. 17, 1953 |
| 2,635,894 | Jackman | Apr. 21, 1953 |

FOREIGN PATENTS

| | | |
|---|---|---|
| 539,292 | Italy | Feb. 8, 1956 |